(12) United States Patent  (10) Patent No.: US 7,784,185 B2
Murray (45) Date of Patent: Aug. 31, 2010

(54) FOAM WHEEL CLADDING PROCESS

(76) Inventor: Scott L. Murray, 1550 Stanlake Dr., East Lansing, MI (US) 48823

( * ) Notice: Subject to any disclaimer, the term of this patent is extended or adjusted under 35 U.S.C. 154(b) by 993 days.

(21) Appl. No.: 11/327,919

(22) Filed: Jan. 9, 2006

(65) Prior Publication Data

US 2007/0157470 A1    Jul. 12, 2007

(51) Int. Cl.
B21D 53/32 (2006.01)
B60B 7/00 (2006.01)
(52) U.S. Cl. .............................. 29/894.381; 29/894.38; 29/458; 264/46.5; 156/79; 425/123; 301/37.43
(58) Field of Classification Search .................. 29/458, 29/460, 894.351, 894.361, 894.38, 894.381; 156/79; 264/46.5; 301/37.43; 425/123
See application file for complete search history.

(56) References Cited

U.S. PATENT DOCUMENTS

| | | | |
|---|---|---|---|
| 3,669,501 A | 6/1972 | Derleth | |
| 3,968,996 A | 7/1976 | Wilcox | |
| 4,339,487 A * | 7/1982 | Mullet | 428/71 |
| 4,847,030 A * | 7/1989 | Stalter | 264/262 |
| 5,368,370 A | 11/1994 | Beam | |
| 5,461,779 A | 10/1995 | Beam | |
| 5,595,423 A | 1/1997 | Heck et al. | |
| 5,597,213 A * | 1/1997 | Chase | 301/37.43 |
| 5,664,845 A | 9/1997 | Maloney et al. | |
| 5,779,951 A * | 7/1998 | Osborne | 264/46.5 |
| 6,152,260 A * | 11/2000 | Eipper et al. | 181/296 |
| 6,233,826 B1 * | 5/2001 | Wycech | 29/897.1 |
| 6,315,938 B1 * | 11/2001 | Jandali | 264/415 |
| 6,346,159 B1 | 2/2002 | Chase et al. | |
| 6,634,698 B2 * | 10/2003 | Kleino | 296/146.6 |
| 6,729,695 B2 * | 5/2004 | Woelfel | 301/37.43 |
| 6,871,898 B2 * | 3/2005 | Jarrard et al. | 296/107.01 |
| 6,932,435 B2 * | 8/2005 | Cutcher et al. | 301/37.11 |
| 6,991,299 B2 * | 1/2006 | Hauler | 301/37.43 |
| 7,025,844 B2 * | 4/2006 | Chase et al. | 156/79 |
| 7,097,730 B2 * | 8/2006 | Woelfel et al. | 156/290 |
| 7,194,804 B2 * | 3/2007 | Czaplicki | 29/897.2 |
| 7,198,686 B2 * | 4/2007 | Mehan et al. | 156/79 |
| 2002/0053179 A1 * | 5/2002 | Wycech | 52/721.4 |
| 2004/0144475 A1 | 7/2004 | Woelfel et al. | |
| 2006/0006569 A1 * | 1/2006 | Chase et al. | 264/46.5 |
| 2009/0302669 A1 * | 12/2009 | Yee et al. | 301/37.43 |

FOREIGN PATENT DOCUMENTS

GB    2373753 A  * 10/2002

* cited by examiner

*Primary Examiner*—Essama Omgba
(74) *Attorney, Agent, or Firm*—Butzel Long (57) ABSTRACT

A process for attaching a wheel cover to a wheel in which a wheel cover and wheel are placed together and a foamable adhesive is injected into the gap defined between the wheel cover and wheel. After the foamable adhesive is injected into the gap defined between the wheel cover and wheel at an injection station, the cover/wheel assembly is transported to a station in which the cover/wheel assembly is heated to a temperature that is sufficient to effect the forming, expansion and curing of the foamable adhesive. The cover/wheel assemblies are supported and transported on carriers that are provided with clamping mechanisms.

15 Claims, 9 Drawing Sheets

FOAM WHEEL CLADDING PROCESS

TECHNICAL FIELD

The present invention relates to vehicle wheels that have decorative wheel covers secured over the wheels for aesthetic purposes. More specifically, the present invention relates to methods for adhesively securing decorative wheel covers to wheels during fabrication of the resulting wheel assemblies.

BACKGROUND ART

Wheel assemblies that utilize wheel appliqués to decorate the external or outboard surfaces of plain steel wheels are well known and are far less expensive to produce than decorative wheels that have to be formed and finished.

Wheel appliqués can be secured to wheels by various mechanical engaging structures and/or by adhesives. U.S. Pat. No. 5,664,845 to Maloney et al. discloses a vehicle wheel cover retention system in which the annular lip of the wheel cover is configured to spring outwardly into a groove provided in the inner surface of the wheel. U.S. Pat. No. 5,595,423 to Heck et al. discloses a vehicle wheel cover retention system in which the outer end of the wheel cover is deformed to cover the outer peripheral end of the outboard bead seat retaining flange of the wheel. Both U.S. Pat. No. 5,664,845 to Maloney et al. and U.S. Pat. No. 5,595,423 to Heck et al. utilize an adhesive in cooperation with their respective mechanical engaging structures.

Many wheel assemblies include decorative wheel covers that are adhesively attached to underlying wheels. U.S. Pat. No. 3,669,501 to Derleth discloses the use of a foamable adhesive that is used to secure a decorative cover to a wheel. The decorative cover in Derleth is configured to have variations in contour in a direction transverse to the axis of the wheel which exceed the variations in the rim and/or disc contour of the wheel, which variations would be extremely difficult and expensive, if not impossible, to stamp or draw in the disc of the wheel. During assembly, a foamable adhesive is coated on the wheel, and the decorative cover is then quickly clamped to the wheel before the adhesive begins to foam. As the adhesive foams, void spaces between the wheel and cover are filled with the foamable adhesive.

Turbine openings which can be decoratively designed are a necessary element in today's wheel systems in providing proper cooling to brake systems. In addition the aesthetics of endless configurations of turbine openings add individuality and style to a vehicle wheels. The inclusion of turbine openings in wheels and wheel covers creates problems with the use of adhesives. In order to use foamable adhesives, it would be necessary to use some additional structure to seal large openings such as turbine openings to prevent the foamable adhesive from escaping through the openings rather than spread evenly or completely between a wheel and wheel cover.

U.S. Pat. Nos. 5,368,370 and 5,461,779 to Beam disclose an ornamental appliqué formed on a uniform thickness of stainless steel sheet stock that requires attachment to the wheel by the use of a full surface curable adhesive uniformly deposited between the stainless steel cover and a mechanical locking arrangement. The mechanical locking arrangement consists of an undercut in the rim of the wheel into which the cover nests and a hole in the wheel aligned with a hole in the appliqué wherein a lug stud is permanently attached to create a mechanical lock that, according to Beam's teachings, compresses the full surface uniform layer of curable adhesive to hold the appliqué in place until the adhesive cures.

U.S. Pat. No. 6,346,159 to Chase et al. discloses a process for attaching overlays (appliqués or covers) to wheels in which the overlays and wheels are positioned together on fixtures to form wheel/overlay assemblies that are transferred to a heating station and then to a filling station at which a foamable adhesive is injected into mold cavities that are defined between the overlays and wheels. The process of Chase et al. utilizes the latent heat of the wheel/overlay assemblies to cause the foamable adhesive to cure.

A disadvantage of the process of Chase et al. is that, since Chase et al. relies upon the latent heat of the wheel/overlay assemblies (from the heating station), it is necessary to include a check station in which the temperature of the wheel/overlay assemblies is monitored. And if the wheel/overlay assemblies are not properly heated to a proper temperature, they are re-routed back to the heating station. This manner of operation is susceptible to complications especially when problems occur at the filling station, causing delays in the transfer of the heating wheel/overlay assemblies. In addition, since Chase et al. holds the wheel/overlay assemblies together at the filling station until the injected foamable adhesive has cured, bottle-necking of the overall process can occur at the filling station, especially when the latent heat is marginal and curing takes a longer time.

The present invention provides for a method for adhesively securing decorative wheel covers to wheels using a foamable adhesive.

DISCLOSURE OF THE INVENTION

According to various features, characteristics and embodiments of the present invention which will become apparent as the description thereof proceeds, the present invention provides a process for attaching a wheel cover to a wheel which involves the steps of a) providing a wheel cover that includes an inboard side and an outboard side;

b) providing a wheel that has an inboard side and an outboard side;

c) positioning the wheel cover on a support with the inboard surface of the wheel cover directed upward;

d) positioning the wheel on the wheel cover so that the outboard surface of the wheel is opposed to the inboard surface of the wheel cover thereby forming a cover/wheel assembly with a gap defined between the outboard surface of the wheel that is opposed to the inboard surface of the wheel cover;

e) injecting a foamable adhesive in the gap defined between the outboard surface of the wheel that is opposed to the inboard surface of the wheel cover at a first work station; and f) heating the cover/wheel assembly from step e) after injection of the foamable adhesive in a second work station to cure the foamable adhesive.

The present invention further provides a process for attaching a wheel cover to a wheel which involves the steps of:

a) providing a wheel cover that includes an inboard side and an outboard side;

b) providing a wheel that has an inboard side and an outboard side;

c) providing a movable carrier;

d) preheating the wheel cover and wheel separately to a first temperature;

e) positioning the wheel cover on the movable carrier with the inboard surface of the wheel cover directed upward;

f) positioning the wheel on the wheel cover so that the outboard surface of the wheel is opposed to the inboard surface of the wheel cover thereby forming a cover/wheel assembly with a gap defined between the outboard surface of the wheel that is opposed to the inboard surface of the wheel cover;

g) injecting a foamable adhesive in the gap defined between the outboard surface of the wheel is opposed to the inboard surface of the wheel cover at a first work station; and f) heating the cover/wheel assembly from step e) after injection of the foamable adhesive in a second work station to a second temperature which is sufficient to cure the foamable adhesive.

BRIEF DESCRIPTION OF DRAWINGS

The present invention will be described with reference to the attached drawings which are given as non-limiting examples only, in which.

BEST MODE FOR CARRYING OUT THE INVENTION

The present invention is directed to a method for adhesively securing decorative wheel covers to wheels using an injectable, foamable adhesive. The process can be used in conjunction with wheel covers that are made from various plastic materials or metals, including stainless steel. The underlying wheel can be made of aluminum, magnesium, steel, or other conventional material. The overall wheel assembly can have virtually any desired design configuration, including various spoke designs and/or various brake vent opening shapes and/or patterns.

The process of the present invention involves positioning a wheel cover on a wheel and injecting a foamable adhesive in the cavity or space defined between the wheel cover and the wheel. The cavity or space defined between the wheel cover and the wheel has a configuration which is dependent upon the difference in the topographies or shapes of the inboard surface of the wheel cover and the outboard surface of the wheel. In some areas the inboard surface of the wheel cover and the outboard surface of the wheel may be close or in contact. In other areas the inboard surface of the wheel cover and the outboard surface of the wheel may be relatively far apart. The overall volume of the cavity or space between the wheel cover and the wheel can be used to determine the amount foamable adhesive that is to be injected into the cavity. The amount of foamable adhesive is determined by taking into account the degree to which the foamable adhesive will expand upon foaming and the amount of pressure exerted when the foamable adhesive expands and cures. Generally, a sufficient amount of foamable adhesive is injected into the cavity or space defined between the wheel cover and the wheel to fill the cavity or space after foaming, expansion and curing. However, it is not necessary to fill the entire cavity or space to securely attach the wheel cover to the wheel.

The foamable adhesive is a two component urethane composition that can include conventional curing or accelerating agents. Alternatively, curing or accelerating agents as well as adhesion promotion agents can be pre-applied to either or both the outboard surface of the wheel and the inboard surface of the wheel cover. The foamable adhesive can be premixed and injected into the cavity or space between the wheel cover and the wheel or an injection nozzle assembly can be used which mixes the components of the urethane adhesive just before injection.

The wheel covers are positioned on wheels to form wheel cover/wheel assemblies that are transported on carriers. Each carrier includes a support base that is configured to support a wheel cover therein with the outboard surface of the wheel cover facing downward and a wheel on the wheel cover with the outboard surface of the wheel facing the inboard surface of the wheel cover. Each carrier also includes a set of temporary clamps such as toggle clamps that are used to releasably hold the wheel cover and wheel together. Each carrier further includes a mechanism that is used, in conjunction with mold seals, to seal brake vent openings in a wheel cover/wheel assembly. In addition, the carriers can include valve stem seal elements that seal any valve stem opening provided in the wheel cover/wheel assemblies.

The basic process involves positioning a wheel cover on a carrier with the outboard surface of the wheel cover facing downward. In a subsequent step, a bead of sealing material such as silicon, urethane, epoxy acrylic, etc. can be applied around brake vent openings in the wheel cover and around the periphery of the wheel cover and around the lug bolt openings (separately or collectively) to provide a barrier to prevent the injected foamable adhesive from leaking out of the brake vent openings, the periphery of the cover/wheel assembly and lug bolt openings. Next the wheel cover is preheated from about 90° F. to about 110° F. and preferably to around 105° F. and a 90° F. to about 140° F. preheated wheel is positioned on the wheel cover with the outboard surface of the wheel facing the inboard surface of the wheel cover. The resulting wheel cover/wheel assembly is clamped together/down on the carrier using clamps such as toggle clamps which can be evenly spaced about the assembly. Next, mold seals are positioned or placed in correct position over each of the brake vent opening on the backside of the wheel and a top lid seal/clamp rim is positioned over the mold seals on the backside of the wheel. As discussed in detail below, a central clamping mechanism provided in the carrier holds the mold seals in position against any pressure created during the subsequent dispersion and foaming of the foamable adhesive.

The carrier having the wheel cover/wheel assembly thereon is transported to a station at which an injector nozzle injects foamable adhesive into the cavity of space between the wheel cover and the wheel.

After the foamable adhesive is injected the wheel cover/wheel assembly can be tilted if necessary to cause the injected adhesive to flow into desired portions of the cavity or space defined between the wheel cover and wheel. Otherwise, after the foamable adhesive is injected the carrier moves on and the wheel assembly/wheel is heated from about 150° F. to about 190° F. and preferably from about 170° F. to about 175° F. until the foamable adhesive is substantially cured. After the foamable adhesive is cured the wheel cover/wheel assembly is released from all the clamping mechanisms and removed from the carrier.

Figure 1:
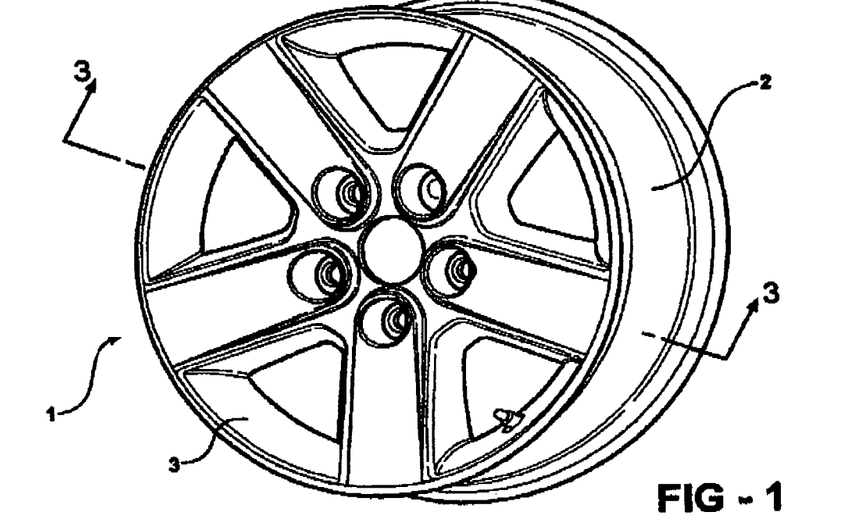
FIG. 1 is a perspective view of a wheel assembly according to one embodiment of the present invention.
Figure 2:
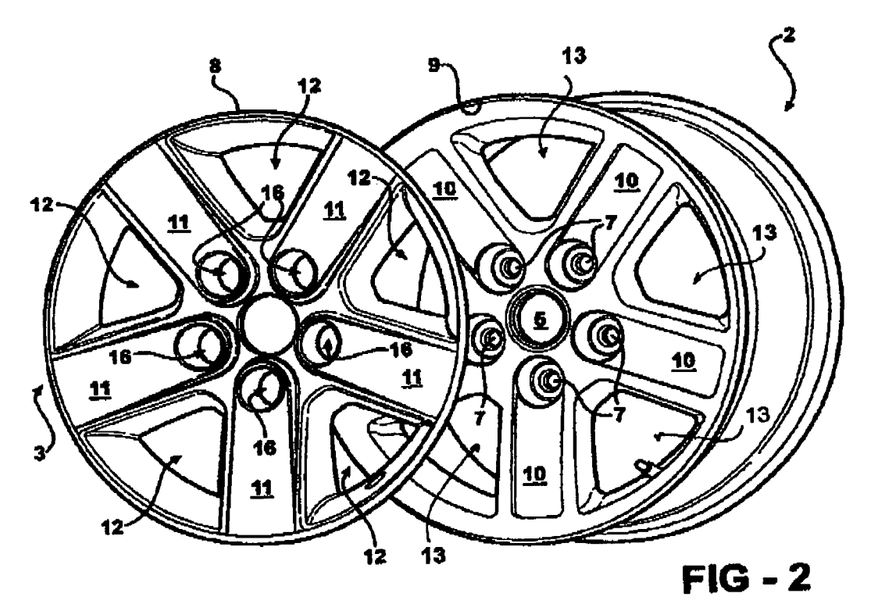
FIG. 2 is an exploded perspective view of the wheel assembly of FIG. 1.

FIG. 1 is a perspective view of a wheel assembly according to one embodiment of the present invention. FIG. 2 is an exploded perspective view of the wheel assembly of FIG. 1. The wheel assembly which is generally identified by reference numeral 1 includes a wheel 2 that can be made of aluminum, magnesium, steel, or other material conventionally used for manufacturing vehicle wheels. A decorative wheel cover 3 is bonded to the otherwise outer exposed surface 4 (See FIG. 2) of wheel 2. The wheel cover 3 is a solid panel of a high-impact plastic that has a high temperature resistance or can be a thin metallic panel such as stainless steel that, in either case has a finished outer surface that can be painted, textured or plated, e.g. chrome plated as desired. An advantage of using a high-impact plastic material such as a combination of polycarbonate and ABS having is that wheel covers 3 made from such materials can be injection molded.

Wheel 2 is of the type which includes a small central opening 5 in the central hub area and a plurality of exposed lug nut apertures 7 arranged in a circular pattern and spaced for the particular vehicle on which wheel assembly 1 is to be employed. Opening 5 will typically be enclosed by a relatively small cap while the lug nuts themselves (not shown) are exposed once the wheel assembly 1 is mounted to a vehicle. It is also within the scope of the present invention to use and produce decorative wheels that have large central openings.

Wheel cover 3 has a geometry and contour which is generally similar to that of wheel 2, including an outer peripheral edge 8 which matingly fits within rim 9 of wheel 2. Spokes 11 extend radially outwardly from the center hub area which corresponds generally in size, shape and location to the pairs of spokes 10 on wheel 2. Between the spokes 11 of wheel cover 3 are brake vent openings 12 that are shaped to conform to corresponding openings 13 in wheel 2. The central hub area surrounding central opening 15 of wheel cover 3 also includes a plurality of lug nut receiving openings 16 which are aligned with and are received within openings 7 in wheel 2 when the wheel cover 3 is position on the wheel 2. The central opening 15 of the wheel cover 3 is aligned with opening 5 in central hub area of wheel 2 as best seen in FIG. 1. When the wheel cover 3 is bonded to wheel 2, the wheel cover 3 appears as an integral outer surface of the wheel 1, as depicted in FIG. 1.

The wheel cover 3 is bonded to wheel 2 by a foamable adhesive which fills a portion, if not all, the cavity or space defined between the wheel cover 3 and the wheel 2.

Figure 3:
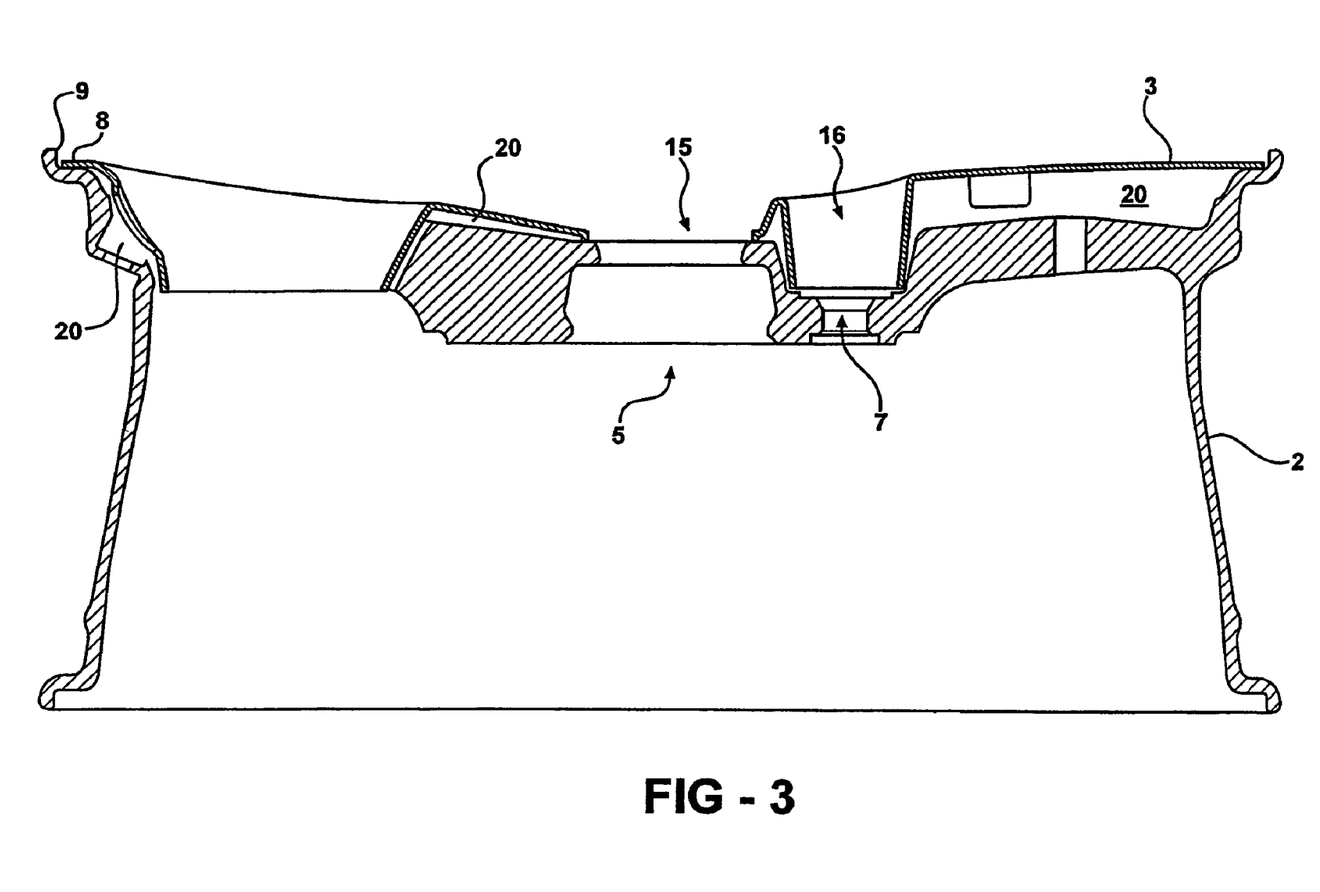
FIG. 3 is a cross-sectional view taken along section lines III-III in FIG. 1.

FIG. 3 is a cross-sectional view taken along section lines III-III in FIG. 1. FIG. 3 depicts how the shape of the cavity or space 20 between the wheel cover 3 and the wheel 2 varies due to the variations or differences in the shapes of the inboard surface of the wheel cover 3 and the outboard surface of the wheel 2. According to the present invention, the foamable adhesive is injected into and foams and expands to fill the cavity or space 20 defined between the wheel cover 3 and the wheel 2.

Figure 4:
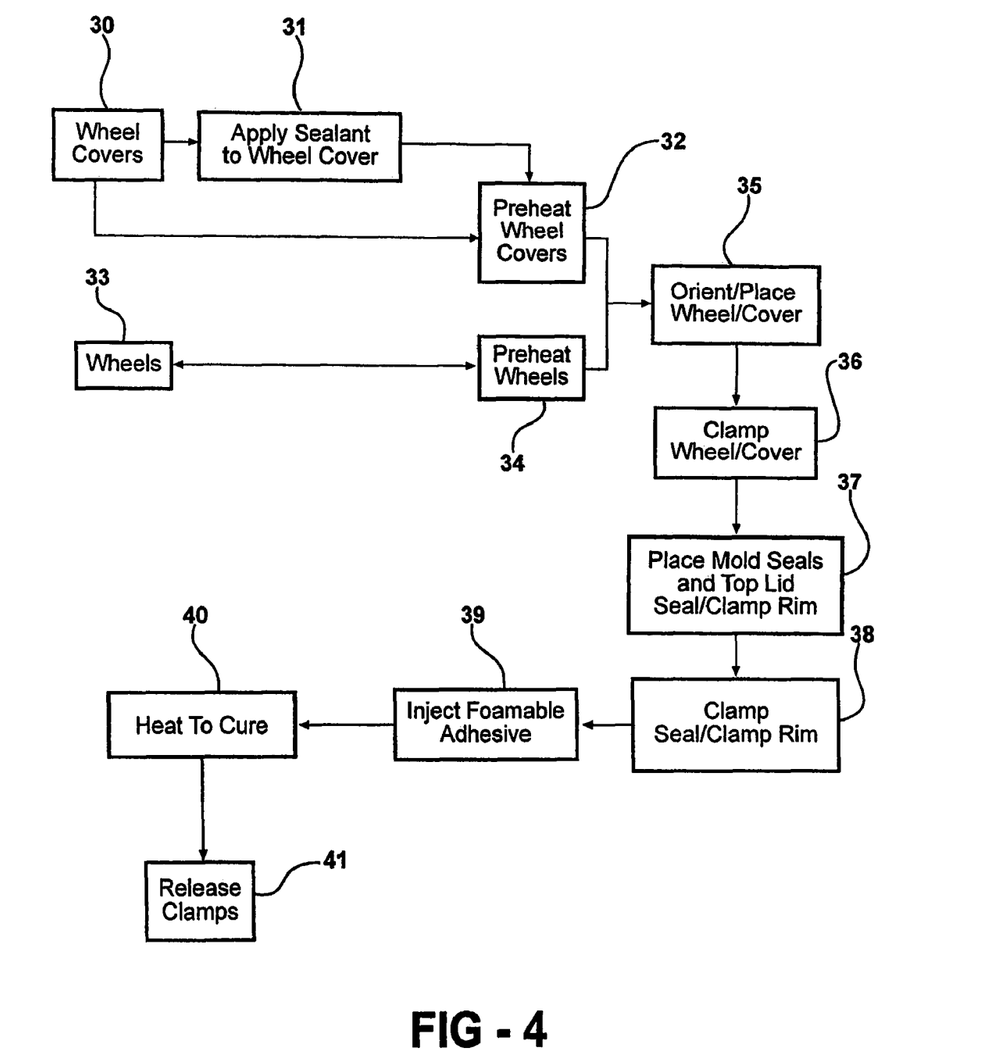
FIG. 4 is a flow chart depicting the steps of adhesively securing a decorative wheel cover to a wheel using a foamable adhesive according to one embodiment of the present invention.

FIG. 4 is a flow chart depicting the steps of adhesively securing a decorative wheel cover to a wheel using an injectable, foamable adhesive according to one embodiment of the present invention.

The wheel covers 3 and wheels 2 are depicted as following parallel operations in the initial portion of the process flow chart. In part, this is to take into account that the wheel covers 3 can be subjected to optional process steps in which a bead or beads of sealant material is/are applied around brake vent openings in the wheel covers and/or around the periphery of the wheel covers and/or around the lug bolt openings (separately or collectively with the central hub opening) to provide a barrier to prevent the injected foamable adhesive from leaking out of the brake vent openings, periphery of the cover/wheel assemblies and lug bolt openings. If sealant beads are not applied to the wheel covers 3, the wheel covers 3 and the wheels 2 are merely preheated to a temperature of from about 90° F. to about 110° F. and preferably to around 105° F. before the wheel cover/wheel assemblies are further processed. It is to be understood that the sealant beads could also or alternatively applied to the outboard surface of the wheel 2.

Following an example of a process in which sealant beads are used, the wheel covers 3 from a stock supply are placed on separate carriers 42 (See FIGS. 6 and 7.) in step 30. The carriers 42, as described in more detail below have support bases 43 that are configured to be complementary shaped to the outboard surface of the wheel covers, so that when the wheel covers 3 are placed face-down on the carriers 42 they are fully supported over substantially their entire outboard surfaces for subsequent injection, foaming and curing of the foamable adhesive. Once the wheel covers 3 are placed on the carriers 42 a bead or beads of sealing material such as silicon, urethane, epoxy acrylic, etc. can be applied around brake vent openings in the wheel cover and/or around the periphery of the wheel cover and/or around the lug bolt openings (separately or collectively with the central hub opening) in step 31 to provide a barrier to prevent the latter injected foamable adhesive from leaking out of the brake vent openings, the periphery of the cover/wheel assembly and lug bolt openings.

After the optional step of applying the bead(s) of sealant, a second optional step (not shown) of applying an adhesive promoter or actuator for the foamable adhesive to the inboard surface of the wheel cover 3 can be implemented. The use of a known adhesion promoter or actuator to improve the adhesive qualities and/or curing rate of the urethane adhesives that are used to attach the wheel covers 3 to the wheels 2 can be used to improve the overall process and resulting wheel assemblies. It is to be understood that the sealant beads and an adhesive promoter or actuator could also or alternatively applied to the outboard surface of the wheel.

The wheels 2 which are received from step 33 are preheated at step 34, while the wheel covers 3 are preheated at step 32. Both the wheels 2 and the wheel covers 3 are heated to a temperature of between about 90° F.-110° F. and preferably to around 105° F. before the wheel cover/wheel assemblies are further processed.

In step 35, the wheels 2 are placed over or on the wheel covers 3 so that the outboard surface of the wheels 2 faces the inboard surface of the wheel covers 3. As discussed herein, a cavity or space 20 defined between the inboard surfaces of the wheel covers 3 and the outboard surface of the wheels 2 is injected with the foamable adhesive in a subsequent process step.

The carriers are provided with clamps such as toggle clamps that are manipulated to releasably hold the wheel covers and wheels together. The temporary clamps can be arranged around the periphery of the wheel cover/wheel assemblies and fastened to the carriers so that when manipulated they clamp the wheel covers and wheels together. This clamping occurs in step 36 of FIG. 4.

In step 37 a plurality of mold sealing elements 44 (See FIG. 7) are positioned over the brake vent openings 13 on the backside of the wheel 2. These mold sealing elements 44 can be made of any resilient material, such as silicone compositions, that can withstand the temperatures to which the wheel cover/wheel assemblies are heated during the curing stage of the process. In addition, the mold sealing elements 44 are preferable made of a material that prevents the foamable adhesive from significantly adhering to the mold sealing elements 44 so that the mold sealing elements 44 can easily be removed at the end of the process. The mold sealing elements 44, as shown in FIG. 8, are beveled and configured to extend around and cover the periphery of the brake vent openings 13. The mold sealing elements 44 also have a thickness which allows them to be pressed and held into position as discussed in more detail below.

After the mold sealing elements 44 are placed into position, a top lid seal/clap rim 45 (See FIGS. 8-10) is positioned over the mold sealing elements 44 on the backside of the wheel 2 in step 37. As discussed in detail below, in step 38 a central clamping mechanism provided in the carriers 42 pulls the top lid seal/clamp rim 45 downward so as to apply pressure against the mold sealing elements 44 so that they seal the peripheral gaps between the wheel covers 3 and brake vent openings 13 formed in the wheels 2. In an alternative embodiment, the mold sealing elements 44 can be attached to the top lid seal/clap rim 45.

Any valve stem opening provided in the wheel can be sealed in or after step 35 or at any time after the wheels 2 are positioned on the wheel covers 3 and the resulting wheel cover/wheel assemblies are clamped together.

In step 39 the foamable adhesive is injected into the cavity or space 20 between the wheel covers 3 and the wheels 2. More specifically, the carriers 42 transport the wheel cover/wheel assemblies to a station at which an injector nozzle 61 (See FIGS. 8 and 9) connects to an injection port provided in the backside of wheels 2 and the foamable adhesive is injected into the cavity or space 20 defined between the wheel covers 3 and the wheels 2. It is to be understood that while one injection nozzle 61 and one injection port are illustrated, two or more injection nozzles and injection ports could be used. It is alternatively possible to inject the foamable adhesive through a gap that can be created between a brake vent opening in the wheel cover and the wheel.

After the foamable adhesive is injected into the cavity or space 20 between the wheel covers 3 and the wheels 2 the carriers 42 transport the wheel cover/wheel assemblies to a station at which the assemblies are heated to a temperature of from about 150° F. to about 190° F. and preferably from about 170° F. to about 175° F. until the foamable adhesive is substantially cured. The heating which effects the curing of the foamable adhesive occurs in step 40 in FIG. 4. The heating can be provided by transporting the cover/wheel assemblies on the carriers 42 through an oven.

Once the foamable adhesive is substantially cured so that the wheel covers 3 are for all practical purposes permanently fixed to the wheels 2 the wheel cover/wheel assemblies are released from the clamping mechanisms in step 41 and removed from the carriers.

Additional process steps that are not shown can include conventional labeling of the wheel assemblies, identifying and labeling balance point information, palletizing the assemblies for shipping or storage, etc.

Figure 5:
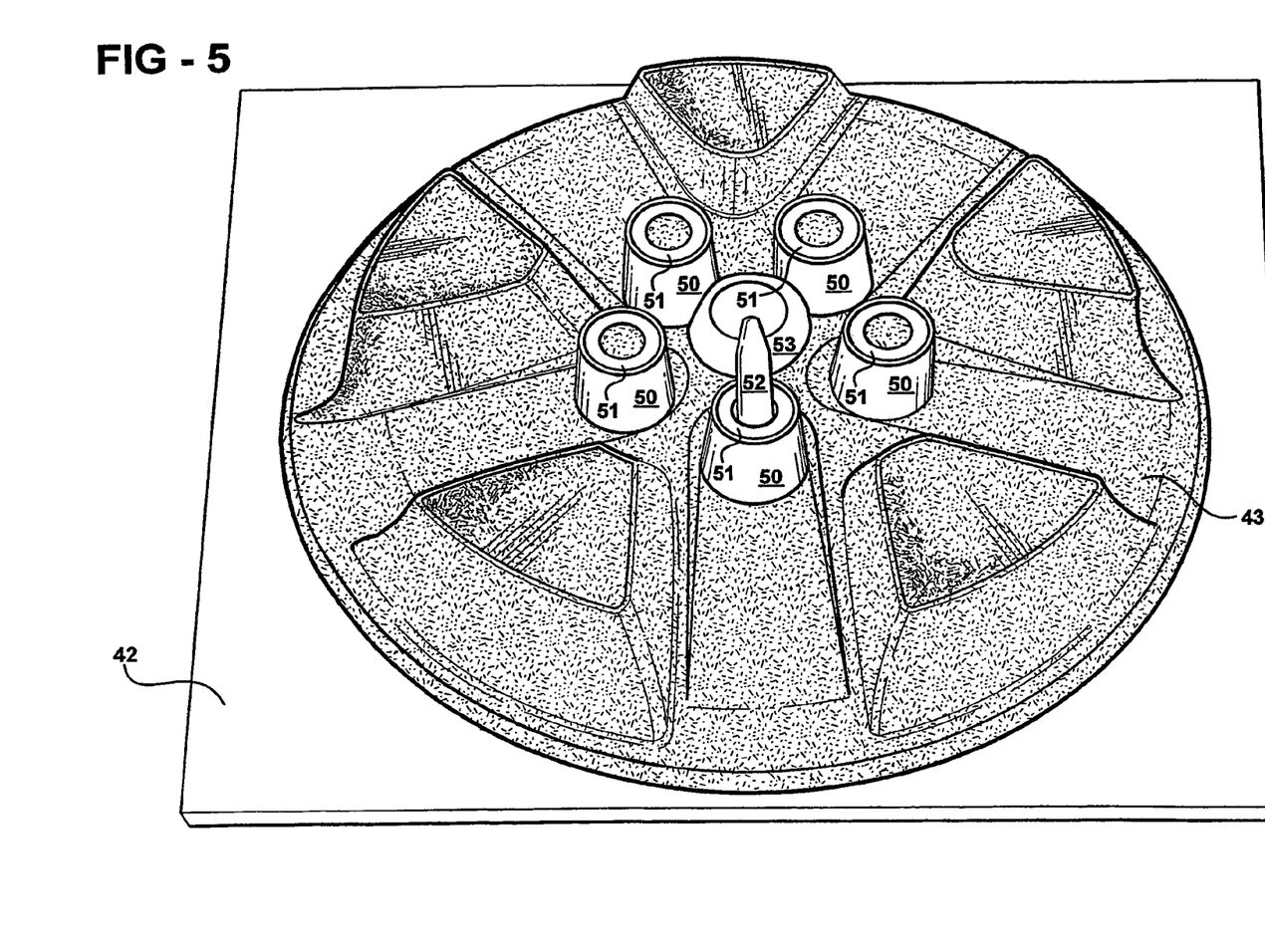
FIG. 5 is a perspective view of the support base for a wheel cover according to one embodiment of the present invention.

FIG. 5 is a perspective view of the support base for a wheel cover according to one embodiment of the present invention. The support base 43 shown in FIG. 5 is mounted on a carrier 42 which is described in more detail below. The support base 43 is configured to be complementary shaped to the outboard surface of the wheel covers 3 so that when the wheel covers 3 are placed face-down on the carriers 42 they are fully supported over substantially their entire outboard surfaces for subsequent injection, foaming and curing of the foamable adhesive. The support base 43 can be made from any suitable material such as plastic materials, metal, resinous materials, etc. that can withstand the temperatures to which the wheel cover/wheel assemblies are heated during the curing stage of the process. Moldable materials are advantageously used to form the support base 43 since they can easily be made complementary to the configuration of the wheel covers 3. However, materials that can be machined worked into the configuration of the wheel covers can also be used.

The support base 43 shown in FIG. 5 includes protrusions 50 that are configured and aligned to extend into and through lug bolt openings 16 formed in the wheel covers 3 and into the lug bolt holes 7 formed in the wheels 2 that are to be placed on and supported by the support base 43. The upper ends of the protrusions 50 can have gasket-like portions 51 that are formed of a more resilient material such as a silicon-based material that will seal within the lug bolt holes 7 of a wheel 2 to be supported by the support base 43. In addition, the upper portions 51 of the protrusions 50 can be flared out or otherwise configured to seat into the lug bolt holes 7 of a wheel 2 to be supported by the support base 43.

The support base 43 shown in FIG. 5 also includes an alignment pin 52 that extends through one of the protrusions 50 and is used to align the wheel covers 3, wheels 2 and orientation of the carrier 42 and cover/wheel assembly supported thereon. The support base 43 also includes a central hub 53 through which a retention mechanism, as discussed below, can extend and cooperate with a top lid seal/clap rim 45.

Figure 6:
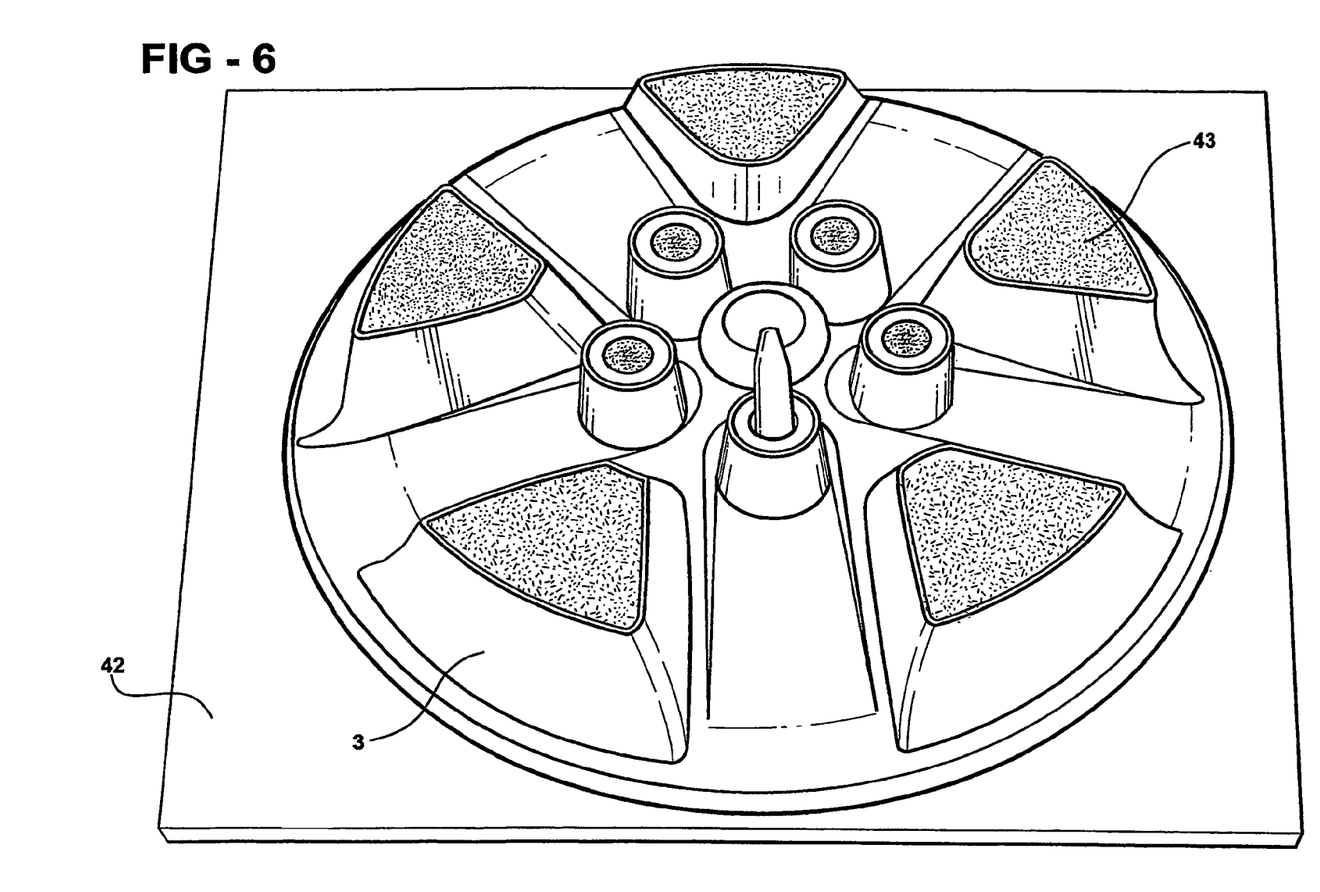
FIG. 6 is a perspective view of a wheel cover positioned on the support base of FIG. 5.

FIG. 6 is a perspective view of a wheel cover positioned on the support base of FIG. 5. As shown in FIG. 6, the outboard surface of the wheel cover 3 substantially matches the shape and configuration of the support base 43 so that there little tolerance between the two. In FIG. 6 the upper portions 51 of the protrusions 50 are shown as having grommet-like shapes that can engage within the lug bolt openings 7 formed in a wheel 2 that is placed over the wheel cover 3.

Figure 7:
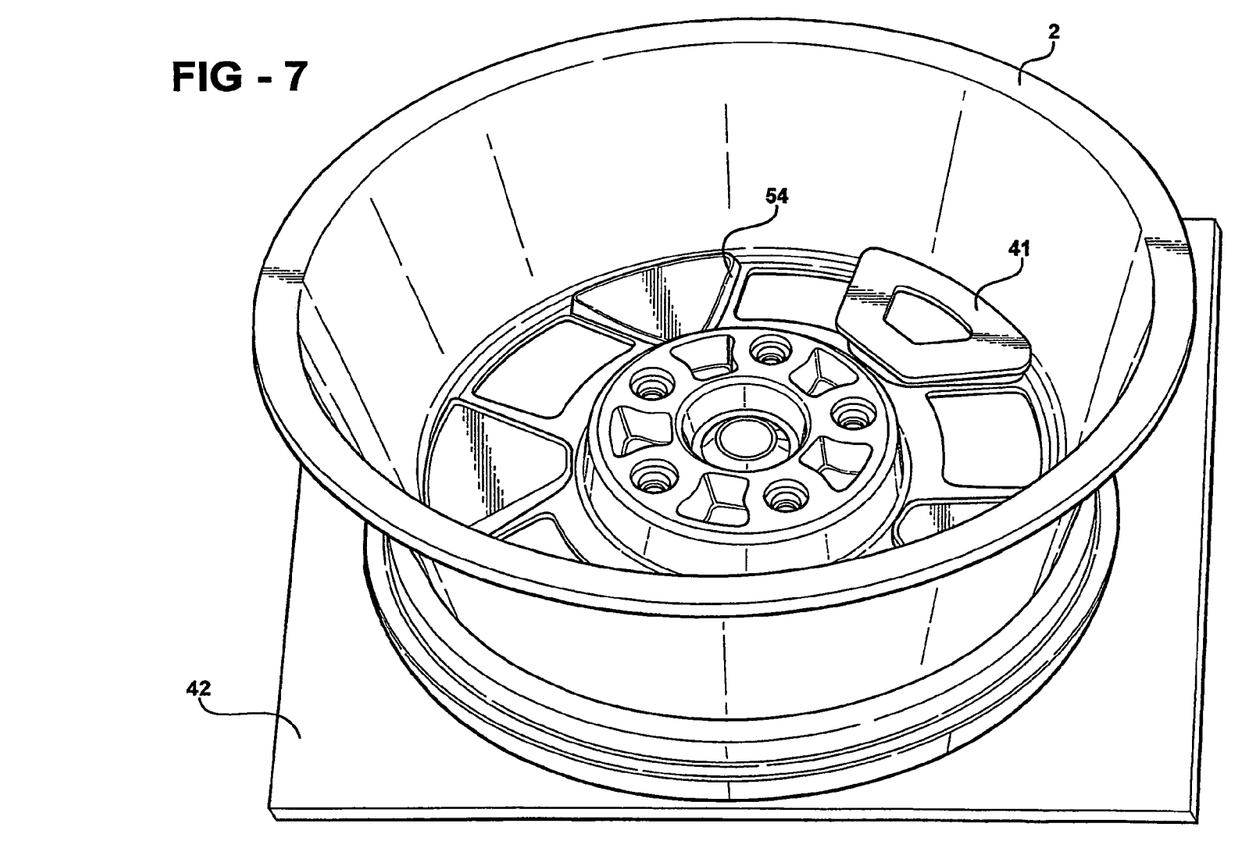
FIG. 7 is a perspective view of a wheel positioned on the wheel cover and support base of FIG. 6 with a mold seal position over one of the brake vent openings in the wheel.
Figure 8:
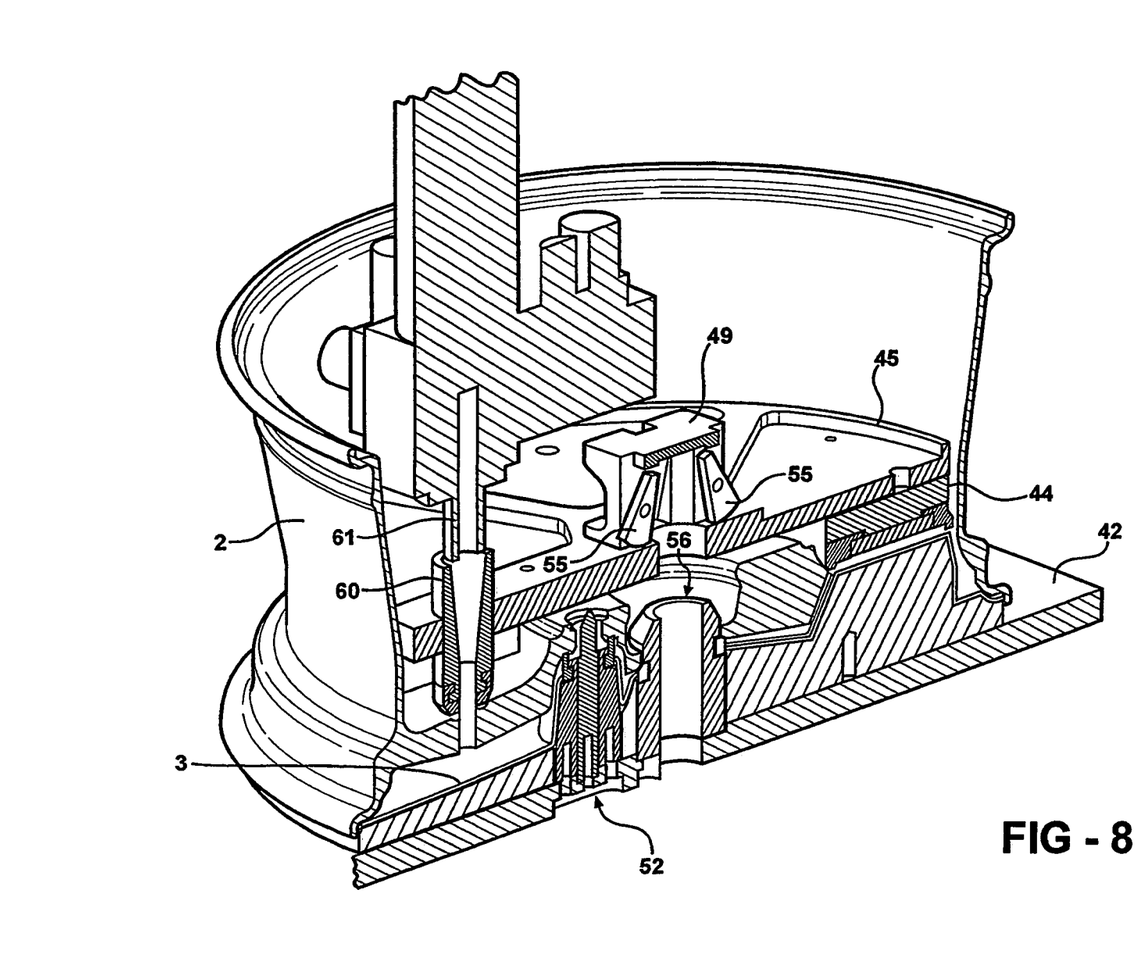
FIG. 8 is a perspective cross-sectional view of a wheel cover/wheel assembly held in the clamping assembly for injection of a foamable adhesion.

FIG. 7 is a perspective view of a wheel positioned on the wheel cover and support base of FIG. 6 with a mold seal position over one of the brake vent openings in the wheel. In FIG. 7, the peripheral gaps 54 between the wheel covers 3 and brake vent openings 7 formed in the wheels 2 can be seen. In addition, a mold sealing element 44 is shown as being positioned over one of the brake vent openings 7 so that, when pressed downward, the mold sealing element 44 will seal the peripheral gap 54 between the wheel covers 3 and brake vent opening. As shown in FIG. 7 the upper portions 51 of the protrusions 50 of the support base 43 extend into but not through the lug bolt holes 7 formed in the wheel 2.

Figure 9:
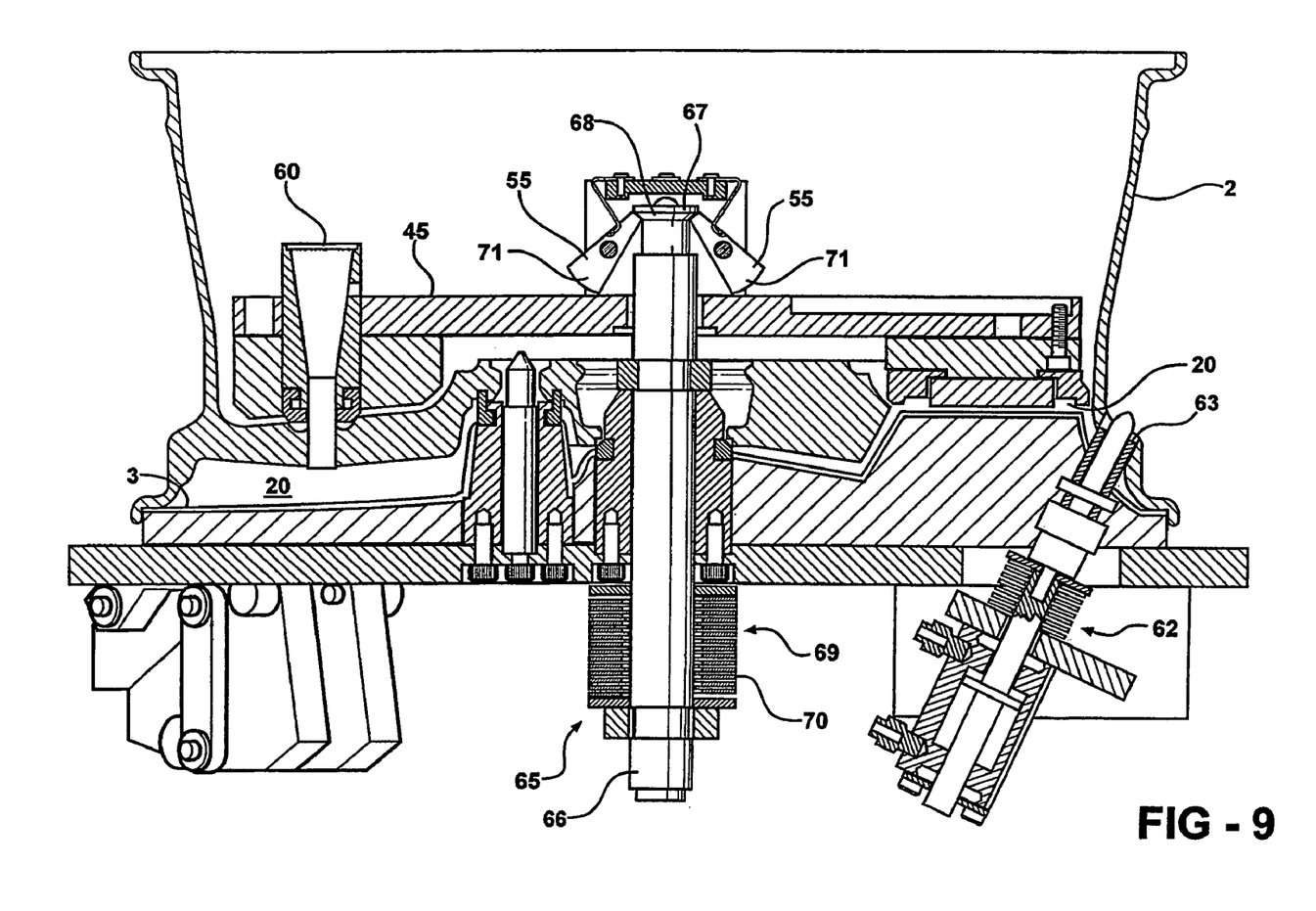
FIG. 9 is a cross-sectional view of a wheel cover/wheel assembly held in the clamping assembly for injection of a foamable adhesion which includes a cross-sectional view of the central clamping mechanism.

FIG. 8 is a perspective cross-sectional view of a wheel cover/wheel assembly held in the clamping assembly for injection of a foamable adhesion. FIG. 9 is a cross-sectional view of a wheel cover/wheel assembly held in the clamping assembly for injection of a foamable adhesion which includes a cross-sectional view of the central clamping mechanism. The top lid seal/clamp rim 45 is shown in FIGS. 8 and 9 as being positioned over the mold sealing elements 44, and including a central structure 49 that supports pivotal latch elements 55 over a central opening 56 provided in the top lid seal/clamp rim 45.

FIG. 8 depicts an injection port 60 into which a foamable adhesive injection nozzle 61 is coupled. It is to be understood that movement of the foamable adhesive injection nozzle 61 can be automated as can other steps in the process.

FIG. 9 depicts a spring-biased sealing element assembly 62 that can be used to seal a valve stem opening 63 provided in the wheel 2. The spring-biased sealing element assembly 62 can be held stationary so that the wheel 2 is pressed against the spring-biased force. Otherwise the spring-biased sealing element assembly 62 can be configured for movement to sealingly engage and seal the valve stem opening 63.

FIG. 9 also depicts an alignment pin 52 that extends through one of the protrusions 50 and is used to align the wheel covers 3, wheels 2 and orientation of the carrier 42 and cover/wheel assembly supported thereon.

The central clamping mechanism 65 shown in FIG. 9 includes a shaft 66 that can move along its vertical axis as depicted in FIG. 9. The top or distal end 67 of the shaft 66 includes an under-cut portion 68 which is configured to engage the upper ends of the pivotal latch elements 55 as depicted. The shaft 66, which can be moved axially by any suitable hydraulic, pneumatic, mechanical or electrical means, has a spring biasing assembly 69 that engages a lower portion of the carrier 42 so that the biasing springs 70 exert a given pressure which pulls the top or distal end 67 of the shaft 66 downward. The engagement of the pivotal latch elements 55 whose upper ends are engaged in the under-cut portion 68 of the top or distal end 67 of the shaft 66 and whose lower ends 71 are pivoted outward to engage the upper surface of the top lid seal/clamp rim 45, causes the biasing pressure of spring 70 to pull the top lid seal/clamp rim 45 downward onto the backside of the wheel 2 so as to seal the space or cavity 20 during and after the injection of the foamable adhesive.

Figure 10:
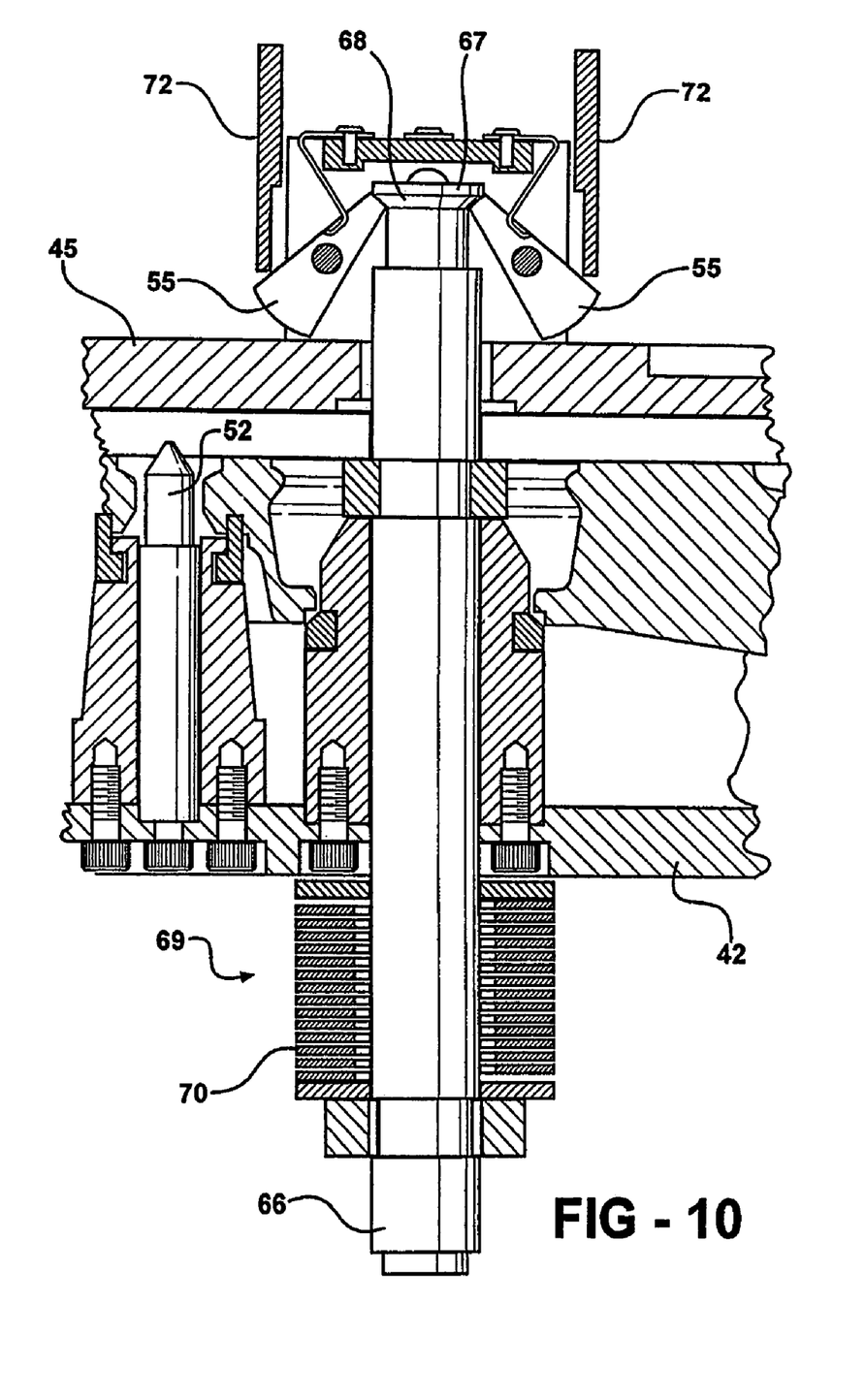
FIG. 10 is a cross-sectional view of the central clamping mechanism of FIG. 9.

FIG. 10 is a cross-sectional view of the central clamping mechanism of FIG. 9. The top lid seal/clamp rim 45 is removed (and positioned) separately and can be automated removed by a mechanism such as a robotic mechanism. As the mechanism that removes top lid seal/clamp rim 45 is lowered into contact with the top lid seal/clamp rim 45, a plurality of fingers 72 push against the outward lower surfaces of the pivotal latch elements 55 to cause the pivotal latch elements 55 to pivot from the position depicted in FIG. 10 to a position in which the upper ends of the pivotal latch elements 55 are disengaged from the under-cut portion 68 of the top or distal end 67 of the shaft 66 (FIG. 9). Once the upper ends of the pivotal latch elements 55 are disengaged from the under-cut portion 68 of the top or distal end 67 of the shaft 66, the top lid seal/clamp rim 45 can be removed by the automated mechanism.

While only two pivotal latch elements 55 are depicted in FIGS. 8-10 it is to be understood that four or more pivotal latch elements 55 can be used together with an equal number of fingers 72.

As indicated above, any or all of the process steps can be conducted in an automated manner or semi-automatic or even manually if desired. In addition, duplicate or alternative parallel process steps can be implemented to ensure continuous production if any one process step stations has to be temporarily stopped. The process has been designed so as to eliminate any bottle-necks or choke-points that will appreciatively slow down the throughput of the overall process. This is accomplished in part by curing the injected foamable adhesive in a separate step from the injection step and providing the unique clamping mechanism that travels with the carriers.

Although the present invention has been described with reference to particular means, materials and embodiments, from the foregoing description, one skilled in the art can easily ascertain the essential characteristics of the present invention and various changes and modifications can be made to adapt the various uses and characteristics without departing from the spirit and scope of the present invention as described above.

What is claimed is:

1. A process for attaching a wheel cover to a wheel said process comprising the steps of:
    providing a wheel cover that includes an inboard surface and an outboard surface and a vent opening;
    providing a wheel that has an inboard surface and an outboard surface and a vent opening;
    positioning the wheel cover on a support with the inboard surface of the wheel cover directed upward, wherein the support includes a movable carrier having a clamping mechanism;
    positioning the wheel on the wheel cover so that the outboard surface of the wheel opposed to the inboard surface of the wheel cover forms a cover/wheel assembly with a gap defined between the outboard surface of the wheel opposed to the inboard surface of the wheel cover;
    sealing a gap between the wheel cover vent and wheel vent by positioning sealing elements over the gaps between the wheel cover vent and wheel vent on the inboard surface of the wheel and positioning a clamping plate over the sealing elements and activating the clamping mechanism to pull the clamping plate against the sealing elements;
    injecting a foamable adhesive in the gap defined between the outboard surface of the wheel and opposed inboard surface of the wheel cover at a first work station; and
    heating the cover/wheel assembly after injecting the foamable adhesive in a second work station to cure the foamable adhesive.

2. A process for attaching a wheel cover to a wheel according to claim 1, wherein the support is a movable carrier.

3. A process for attaching a wheel cover to a wheel according to claim 1, wherein the carrier is provided with a clamping mechanism that secures the wheel against the wheel cover.

4. A process for attaching a wheel cover to a wheel according to claim 1, wherein a sealant is provided around at least one of the periphery of the wheel cover vent and lug bolt openings formed in the wheel cover.

5. A process for attaching a wheel cover to a wheel according to claim 1, wherein the second work station comprises an oven.

6. A process for attaching a wheel cover to a wheel according to claim 1, wherein an at least one of an adhesion promoter, curing agent and accelerating agent is applied to at least one of the inboard surface of the wheel cover and the outboard surface of the wheel.

7. A process for attaching a wheel cover to a wheel according to claim 1, wherein the first temperature is from about 90 to about 110.degree. C.

8. A process for attaching a wheel cover to a wheel according to claim 7, wherein the second temperature is from about 150 to about 190.degree. C.

9. A process for attaching a wheel cover to a wheel said process including the steps of:
    providing a wheel cover that includes an inboard surface and an outboard surface and a vent opening;
    providing a wheel that has an inboard surface and an outboard surface and a vent opening;

preheating each of the wheel cover and wheel separately to a first temperature;

positioning the wheel cover on a movable carrier having a clamping mechanism, with the inboard surface of the wheel cover directed upward;

positioning the wheel on the wheel cover so that the outboard surface of the wheel opposed to the inboard surface of the wheel cover forms a cover/wheel assembly having a gap defined between the outboard surface of the wheel and opposed inboard surface of the wheel cover;

sealing a gap between the wheel cover vent and the wheel vent by positioning sealing elements over the gaps between the wheel cover vent and the wheel vent on the inboard surface of the wheel and positioning a clamping plate over the sealing elements and activating the clamping mechanism to pull the clamping plate against the sealing elements;

injecting a foamable adhesive in the gap defined between the outboard surface of the wheel opposed the inboard surface of the wheel cover at a first work station; and heating the cover/wheel assembly in a second work station to a second temperature that is higher than the first temperature to cure the foamable adhesive, wherein the cover/wheel assembly is transported between the first work station and the second work station by moving the carrier between the first and second work stations.

10. A process for attaching a wheel cover to a wheel according to claim 9, wherein a sealant is provided around at least one of the periphery of a wheel cover brake vent openings formed in the wheel cover and lug bolt openings formed in the wheel cover.

11. A process for attaching a wheel cover to a wheel according to claim 9, wherein the second work station comprises an oven.

12. A process for attaching a wheel cover to a wheel according to claim 9, wherein the clamping plate includes a plurality of pivotal latch elements and the clamping mechanism comprises an axially movable shaft having a distal end that is configured to engage upper ends of the pivotal latch elements and pull the clamping plate towards the carrier.

13. A process for attaching a wheel cover to a wheel according to claim 9, wherein the clamping mechanism further includes a spring biasing assembly.

14. A process for attaching a wheel cover to a wheel according to claim 9, wherein the wheel includes a valve stem opening and the clamping mechanism further includes a sealing element for sealing the valve stem opening.

15. A process for attaching a wheel cover to a wheel according to claim 9, wherein an at least one of an adhesion promoter, curing agent and accelerating agent is applied to at least one of the inboard surface of the wheel cover and the outboard surface of the wheel.

* * * * *